United States Patent
Bögelein et al.

(10) Patent No.: US 6,776,067 B2
(45) Date of Patent: Aug. 17, 2004

(54) HARMONIC DRIVE AND INTERNAL GEARED WHEEL FOR A DRIVE OF THIS TYPE

(75) Inventors: Joseph Bögelein, Sachsen b. Ansbach (DE); Frank Pöhlau, Fürth (DE)

(73) Assignee: Oechsler Aktiengesellschaft, Ansbach (DE)

(*) Notice: Subject to any disclaimer, the term of this patent is extended or adjusted under 35 U.S.C. 154(b) by 0 days.

(21) Appl. No.: 10/220,825
(22) PCT Filed: Feb. 22, 2001
(86) PCT No.: PCT/EP01/02038
§ 371 (c)(1), (2), (4) Date: Oct. 24, 2002
(87) PCT Pub. No.: WO01/66976
PCT Pub. Date: Sep. 13, 2001

(65) Prior Publication Data
US 2003/0089186 A1 May 15, 2003

(30) Foreign Application Priority Data
Mar. 4, 2000 (DE) .......................... 100 10 680

(51) Int. Cl.$^7$ .......................... F16H 33/00; F16H 57/00
(52) U.S. Cl. .......................... 74/640; 74/411
(58) Field of Search .......................... 74/411, DIG. 10, 74/640; 464/75, 89

(56) References Cited

U.S. PATENT DOCUMENTS 3,088,333 A * 5/1963 Musser .......................... 74/640
6,109,136 A * 8/2000 Dold .......................... 74/640
6,202,509 B1 * 3/2001 Dold .......................... 74/640
6,220,115 B1 * 4/2001 Hirn et al. .......................... 74/640
2003/0047025 A1 * 3/2003 Ruttor .......................... 74/640
2003/0089194 A1 * 5/2003 Ruttor et al .......................... 74/640

FOREIGN PATENT DOCUMENTS

| DE | 9109077 U | 9/1991 |
| DE | 29614738 U | 10/1996 |
| DE | 19650716 C | 4/1998 |
| DE | 19912761 A | 9/1999 |
| EP | 0974773 A | 1/2000 |

* cited by examiner

Primary Examiner—Roger Pang
(74) Attorney, Agent, or Firm—Horst M. Kasper

(57) ABSTRACT

The invention relates to a harmonic drive (12) which can be provided with overload protection that is easy to influence constructionally and a free-wheeling characteristic. To this end, the spokes (21) of the internal geared wheel (15) are specifically deformable depending on the torque or the direction of rotation. The spoke shafts (22) are divided crosswise to the drive axis (24) or in a radial direction in relation thereto. This division (45) is bridged over flexibly in the peripheral direction of the internal geared wheel so that the effective radial length of the spoke may be reduced in the presence of the appropriate bending stress by buckling the shaft, in order to then eliminate the local toothing contact between the internal geared wheel edges (13) and the outer support ring (11) in the extension of the spoke. The bridging of the spoke division can be configured differently for the two directions of rotation in order to obtain different response characteristics, up to direction-dependent free-wheeling characteristics e.g. in the event of a considerably unsymmetrical spoke shaft course in relation to the radials.

6 Claims, 3 Drawing Sheets

HARMONIC DRIVE AND INTERNAL GEARED WHEEL FOR A DRIVE OF THIS TYPE

Figure 1:
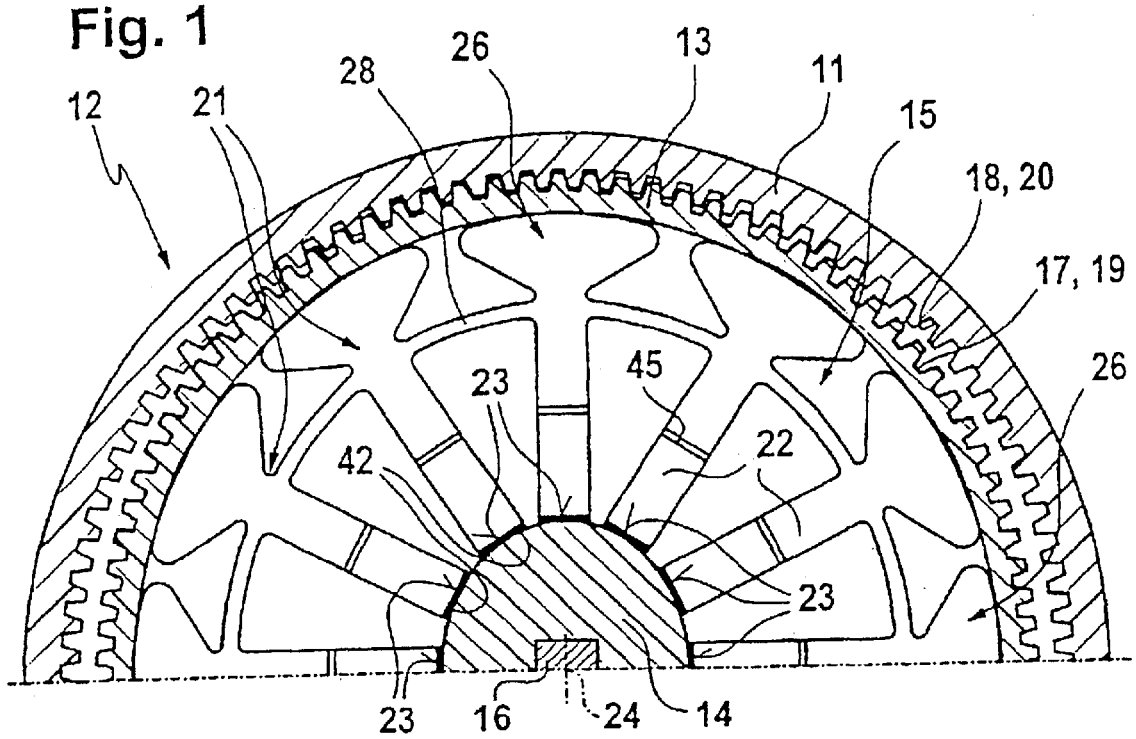

The invention relates to a harmonic drive and internal geared wheels for such drives according to the respective preamble of the main claims, as known in this respect from DE 1 96 50 716 C1 relating to an eccentric drive with overload protection.

The function of such an eccentric or harmonic drive—also known as a circular spline drive—as a very greatly reducing, self-locking system with an output shaft coaxial with the drive shaft is based on the fact that a rotating wave generator radially deforms an internal geared wheel rim, also referred to as a flexspline, orbitally and in this way orbitally presses its outer lateral surface outward locally against the hollow-cylindrical inner lateral surface of slightly greater circumference of a stationary, dimensionally stable support ring. Consequently, the internal geared wheel itself or its wheel rim mounted rotatably thereon rolls in the support ring non-positively via friction surfaces or positively via toothings, the wheel or its rim rotating more slowly than the motor-driven driving core of the wave generator according to the difference in circumference. This rotary motion, which is greatly slowed in relation to the drive, is preferably transmitted via the outer toothing of the wheel rim to the inner toothing of a further hollow-cylindrical outer ring of the output ring which is concentric with the support ring but not stationary. The drive of the wave generator usually takes place via a coaxially flanged-on high-speed, and therefore inexpensively procurable, extra-low-voltage d.c. motor, the rotation of which is thus reduced to a very much slower rotary motion of correspondingly greater torque.

In the embodiments of such harmonic drives known from German Utility Model 2 96 14 738 and described in greater detail in the article "Genial einfach [Ingeniously simple]" by H. Hirn (KEM Antriebstechnik, issue November 1996), a non-round (in axial cross section roughly triangular or preferably oval) driving core, as the wave generator, is rotated concentrically in the hub of the radially deformable internal geared wheel. Dimensionally stable spokes, acting as radially oriented push rods, between the hub deformed radially by the driving core and the likewise radially deformable, externally toothed rim of this internal geared wheel cause the outer toothing, according to its orbital radial deformation, to enter into engagement with the inner toothing of the support ring at any one time over only a limited curved segment rolling therein.

The dimensional stability of the spokes must be guaranteed above all in the radial direction in order for it to be possible to transmit the orbital radial deformation of the hub (referred to as an internal geared wheel in the prior publication constituting the generic type) generated by the wave generator to the rim (referred to as the external geared wheel there). However, during the rolling operation of the rim in the support ring, which takes place under load, the spokes of this segment, which are linear there and described as flexible in the peripheral direction, are also subjected to bending stress at both their ends. If they then bend in the peripheral direction out of the radial direction, the diameter of the rim decreases until it comes out of engagement with the support ring. The spokes thus act as overload protection on the harmonic drive.

The invention is based on the technical problem of, while retaining its advantages in terms of apparatus and application, to develop the previously known harmonic drive or its internal geared wheel to the effect that it can be designed considerably more flexibly in particular with regard to the kinetic conditions when the overload protection responds and will thus have a greater variety of uses.

According to the invention, this object is achieved by the harmonic drive according to the generic type and its internal geared wheel being designed with the features of the respective main claim. Accordingly, the internal geared wheel is still equipped with spokes, which are no longer dimensionally stable in the peripheral direction at critical stress, a torque-dependent—and optionally a rotation-direction-dependent—response of this safeguarding function against overloading then being specifically constructionally influencable with regard to many parameters owing to the special shaping or material combination, according to the invention, of the spokes. As mentioned, such restorable deformation occurs depending on the flexural rigidity of the spoke when that segment of the wheel rim assigned to its radial orientation is directly in engagement with the support ring and a constructionally specified critical bending stress of this spoke is on that account exceeded during the rolling operation.

In this connection, the deformability of the spokes can therefore be designed so as to be independent of the direction of rotation of the driving core in the wheel hub, so that, as it were, the function of an overload protection or slipping clutch acting in both drive directions is brought about. On the other hand, this function can also be defined so as to be dependent on the direction of rotation by the spoke having, owing to its geometry or material combination, a different flexural rigidity in one direction of rotation than in the opposite one—up to the free-wheeling characteristic in one direction with power transmission in only the specified other direction, the working direction. This is because the deformation of the spoke shaft, which is subject to overload or which is now no longer flexurally rigid in the counter-rotation direction, shortens the radially effective spoke length of the internal geared wheel and thus the local radial deformation of the wheel rim, that is to say its toothing engagement with the support wheel, which then ratchets through and thus comes out of engagement, as a result of which the power and motion transmission via the harmonic drive is interrupted.

Consequently, by means of the measures according to the invention, that is to say as a result of influencing the toothing engagement, the toothing parameter on the wheel rim (flexspline) is modified in such a way that, when the specified maximum torque is exceeded, ratcheting-over of the toothing occurs. This leads to the drive coming to a standstill in the event of overload, in which connection this torque-limiting by means of buckling spokes up to free-wheeling functioning owing to spokes being inclined in relation to the radials or owing to spokes folding down can also be direction-dependent, without additional functional assemblies having to be introduced for this before or after the harmonic drive.

Figure 3:
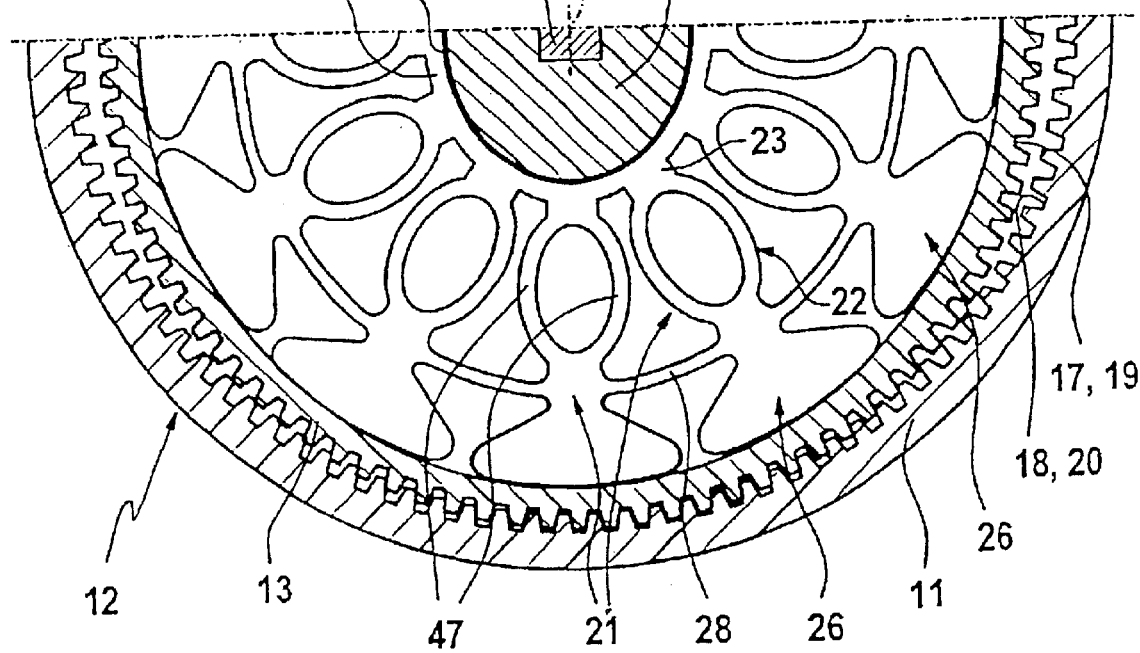
Figure 2:
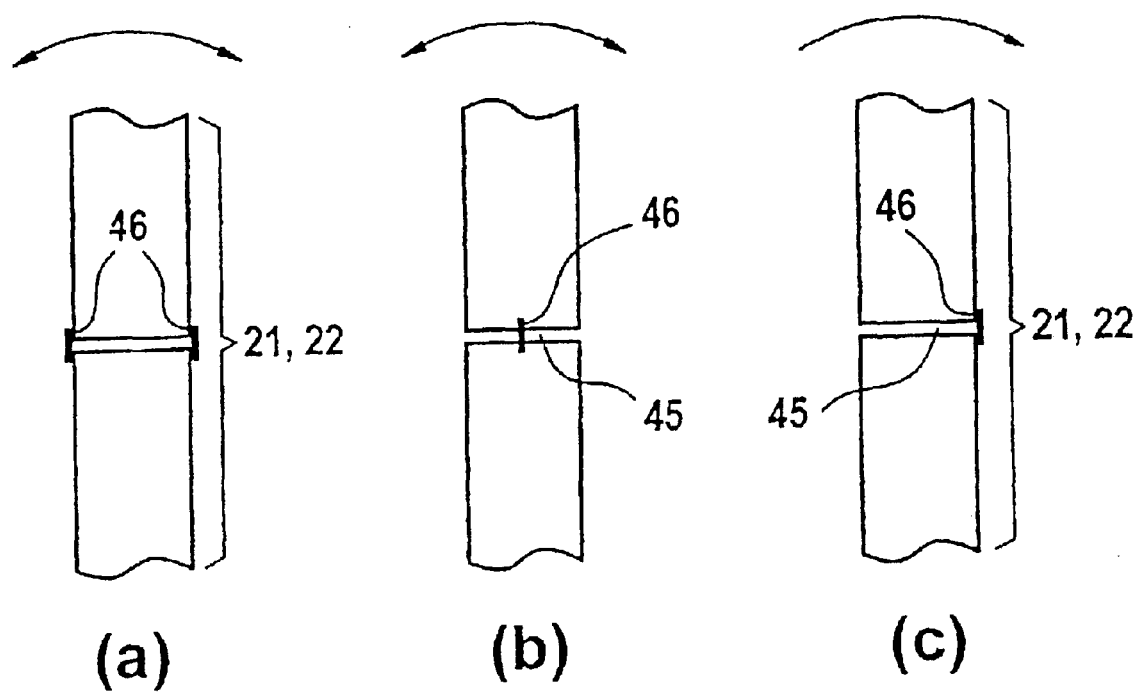
Figure 4:
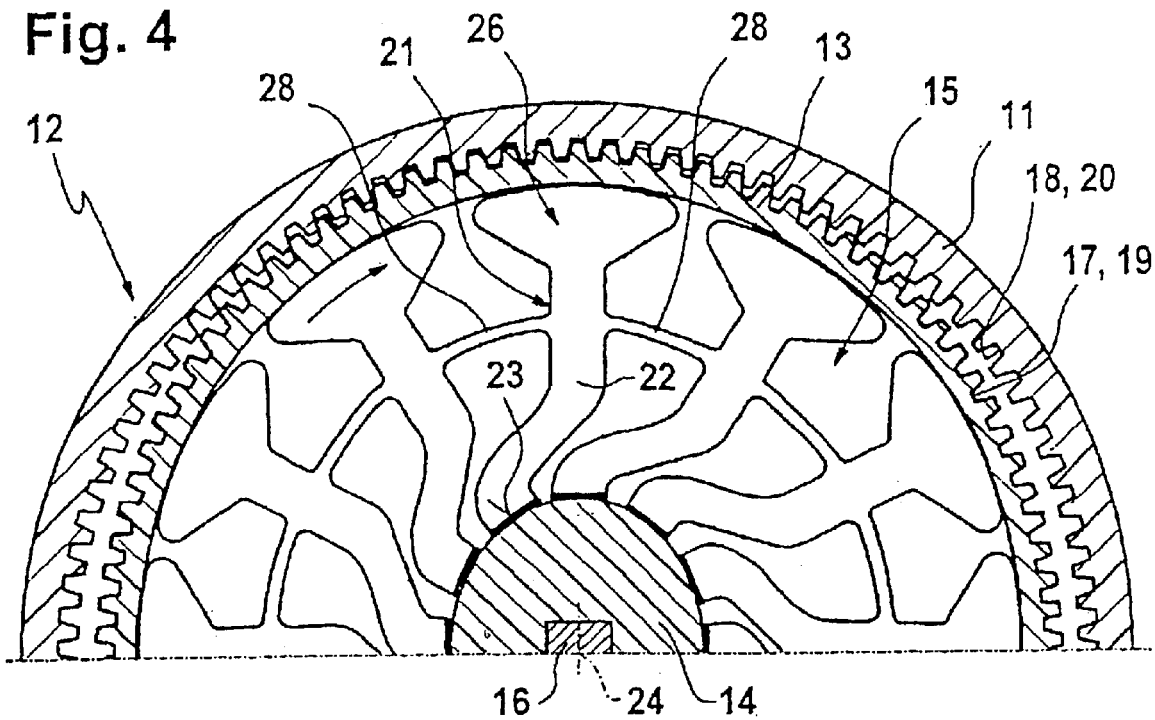
Figure 5:
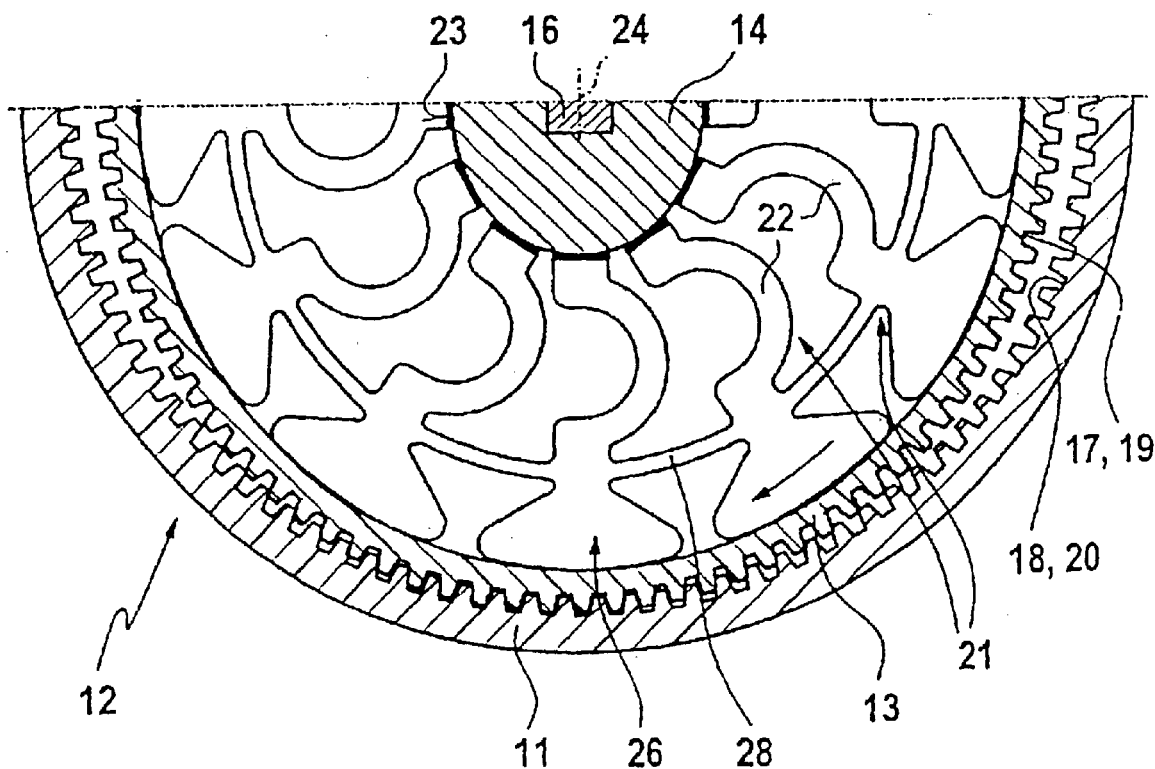

With regard to other details and additional developments of the invention, reference is made to the following description of preferred illustrative embodiments of the solution according to the invention and to the other claims and also, to supplement the disclosure, to our two current German patent applications with the same title. In the drawing, which is enlarged not entirely to scale and simplified to the essential in terms of function, with very rough toothing geometry:

FIG. 1 shows the upper half of a wheel rim, which rolls in the support ring fixed relative to the housing, on a harmonic drive internal geared wheel with solid parallelepipedal spokes which are flexurally non-rigid, if appropriate in a rotation-direction-dependent manner, owing to transverse division of their shaft in an axially parallel manner relative to the drive axis, FIG. 2 shows part spokes from FIG. 1 coupled (*a*) elastically on both sides (*b*) singly elastically and (*c*) pivotably on one side, FIG. 3 shows in modification of FIG. 2(*a*) the lower half of a wheel rim, which rolls in the support ring fixed relative to the housing, on a harmonic drive internal geared wheel with spokes which are flexurally non-rigid, if appropriate in a rotation-direction-dependent manner, owing to slots which are radial relative to the drive axis, and FIGS. 4 and 5 show in modification of FIG. 3 the upper and, respectively, in modification of FIG. 4 the lower half of a wheel rim, which rolls on a support ring fixed relative to the housing, on a harmonic drive internal geared wheel with a spoke which is flexurally non-rigid in a rotation-direction-dependent manner owing to a shape which is curved in relation to the radial direction toward the drive axis.

The drawing illustrates, in each case in cutaway axial section, views toward the end sides 13 of various internal geared wheels 15, each equipped with a plurality of identical spokes 21, inside their support ring 11, which is in each case fixed relative to the housing and dimensionally stably hollow-cylindrical, of harmonic drives 12.

It is true for each of the harmonic drives 12 illustrated that its non-round (preferably oval in axial cross section as illustrated) dimensionally stable driving core 14 extends coaxially through the radially deformable internal geared wheel 15 with its wheel rim 13. In the driving core 14 in turn, which is rotatable concentrically in the internal geared wheel 15, a drive shaft 16, which may directly be the lengthened motor shaft of a drive means (not visible in the sectional illustration, located concentrically above the drawing plane in the form of, for instance, an electric or fluid motor), engages, again coaxially with the drive axis 24 but in this case in a rotationally fixed manner.

The wheel rim 13, which is deformed orbitally in a non-round manner in cross section by the driving core 14 via the radial push-rod action of the spokes 21, is rotationally connected to the dimensionally stably hollow-cylindrical inner lateral surface 18 of the stationary support ring 11 non-positively or, as illustrated, positively via a radial toothing 19/20 only in extension of the major radii of the driving core 14 along that curved segment of its outer lateral surface 17 which is displaced radially outward sufficiently far there. When the driving core 14 rotates, the orbitally radially deformed outer toothing 19 rolls in the support ring 11 and, on account of its smaller circumference, performs less than a full revolution with each revolution of the driving core 14. In this connection, the rim 13 can be rotatable relative to the internal geared wheel 15, and the internal geared wheel 15 can also stand still completely.

At least this externally toothed rim 13 extends with its toothing 19 axially below the drawing plane and out of the support ring 11 into a further likewise dimensionally stably hollow-cylindrical outer ring which is axially adjacent to the support ring 11 visible in the drawing but in this case is not arranged in a stationary manner but is mounted, as the coaxial output ring of this very greatly reducing drive 12, corotatably by the toothing 19 of the rim 13. In order that the outer rings (support ring 11 and output ring), which, like the internal geared wheel 15, are likewise usually produced by injection-molding plastic, do not widen radially under load and then allow their respective toothing to ratchet through in relation to the rim 13, they is are appropriately dimensionally stabilized by reinforcing rings made of, for instance, metal, which are applied subsequently or, better still, molded in straightaway (not visible from the sectional plane of the drawing).

The axially long and radially wide radially deformable internal geared wheel 15 is assembled from a number of identical movably interconnected push-rod-like spokes 21 lying next to one another in a ray-like manner. Each of these per se dimensionally stable spokes 21 consists first and foremost of a parallelepipedal shaft 22 which extends roughly over the axial length of the driving core 14 and thus of the internal geared wheel 15 and of its rim 13. Either the shaft is, according to FIG. 1, supported by its foot 23 directly along the generatrix and, in relation to the drive axis 24, radially on the cross-sectionally non-round outer lateral surface of the driving core 14, or the foot 23 emerges radially from a radially deformable wheel hub 25, as in FIG. 3. The contact region of each foot 23 and, as the case may be, the inner lateral surface of the hub 25 are expediently equipped with a dimensionally stable, wear-resistant and temperature-resistant coating 42 or insert which slides readily in relation to the material of the driving core lateral surface.

Opposite the foot 23, each of the per se dimensionally stable T-shaped spoke shafts 22 ends in a—preferably somewhat radially elastically compressible—head 26 which bears the rim 13 in a rotationally rigid manner or over which the rim 13 runs with good sliding properties. The head 26 has essentially the cross-sectional shape of a cylinder sector or hollow-cylinder sector extending axially parallel over the length of the driving core 14 and thus the axially parallel length of the shaft 22. In contrast to this illustrative embodiment, however, a separate rim 13 which can be locally radially widened orbitally does not have to be borne by the internal geared wheel 15, but the spaced peripheral sequence of the heads 26 can also serve directly as the outer lateral surface 17 of an internal geared wheel 15 with a wheel rim (13) formed in one piece therewith, which surface is discontinuous in the peripheral direction, equipped with outer toothing 19 and is pressed radially into the inner lateral surface 18 of the support ring 11 orbitally.

The lateral support of the spokes 21 in their peripheral sequence in relation to one another, and thus at the same time their circular positioning and movable connection to form the assembled internal geared wheel 15, can be brought about by means of short arms 28 formed laterally opposite one another and preferably in one piece on the respective shaft 22 (according to FIG. 1, for instance), but also, instead of or in addition to this, by means of the positioning of the spokes 21 along the circumference of the wheel hub 25 (cf. FIG. 3).

During operation of the drive 12, the spokes 21, which primarily transmit the orbital radial deformation force from the driving core 14 to the rim 13 in a push-rod-like manner, are also subjected to bending stress depending on the direction of rotation of the driving core 14. According to the invention, the torque which can be transmitted via the drive 12 is in this case limited by the flexural rigidity of the spokes 21 being specifically weakened. According to FIG. 1 and FIG. 2, it is to this end envisaged to divide the parallelepipedal shafts 22 of the spokes 21 parallel to the drive axis 24 roughly centrally, that is to say roughly halfway along their radial longitudinal extent, and in each case to interconnect the two part shafts across this separating gap 45 by means of a flexible coupling 46. For FIGS. 2(*a*) and (*b*), elastically extensible couplings 46 are provided for these bridges, two of which are arranged, at the two ends of the dividing gap 45, in the former, and one of which is arranged in the extent of the dividing gap 45 in the latter. In this way, pivoting (as indicated by the arrows in the drawing) of the two parts of the shaft 22 in relation to one another, with mutual support of the end faces opposite one another at the dividing gap 45, is made possible when the torque stress between the driving core 14 and the support ring 11 exceeds a constructionally specified response value. This response value can be influenced via the position, the direction and the geometry of the dividing gap 45 in the shaft 22 and also via the extension behavior of the couplings 46 relative to one another (a) or via the position of the coupling in the interior of the dividing gap 45 (b). In this way, it is also possible to specify that the load limit in one direction of rotation is different than in the opposite direction of rotation, so as, for instance during operation of an installation, to limit the working load to a function-critical value but, in the event of a fault occurring, to ensure movement back under full power. For pure free-wheeling functioning, all that is necessary, according to FIG. 2(c), is to design a coupling without elasticity at that end of the dividing gap 45 lying in the direction of rotation, in other words a simple bending hinge which, when a backward motion takes place (in the opposite direction to the arrow in the drawing), allows the end faces on both sides of the dividing gap 45 to fold apart and in this way, owing to shortening of the effective radial length of the spoke 21, takes the toothing 19/20 out of engagement. The elastic or only flexurally non-rigid couplings 46 for bridging the dividing gaps 45 can be applied in the form of separate construction elements but they can also be integrated simply in the form of film strips between the part shafts 22 in the course of manufacture by injection molding.

In the variant according to FIG. 3, the shaft 22 of the spokes 21 is, in contrast to FIGS. 1/2(a, b, c), no longer divided transversely to their longitudinal extent but, in modification of FIG. 2(a), is divided longitudinally over part of their radial longitudinal extent to form two lateral branches 47 so as to bring about a determinately flexurally rigid zone roughly in the central region of the shaft 22. This zone can again, in this case by means of, for instance, different thickness of the two parallel branches 47 of the longitudinally divided shaft 22, be dimensioned differently for the two directions of rotation.

In an extreme case, one of the parallel branches 47 is omitted entirely, so that geometries according to, for instance, FIG. 4 and finally the shape of the spokes 21 according to FIG. 5, curved in a leading manner in the working direction of rotation, are obtained for the shafts 22. These are internal geared wheels 15 with a free-wheeling characteristic in the opposite direction of rotation, which does not (like the working direction indicated by the respective arrow) lead to a radial spreading of the outer lateral surface 17 for the local engagement of the rim 13 in the support ring 11. In this connection, the response behavior of the free-wheeling characteristic when the torque is reversed can also be constructionally influenced, in addition to via the geometry of the leading shape of these spokes 21, via the radial position in the drive cross section and via the rigidity of the peripheral connecting arms 28 between the spokes 21.

According to the. invention, a harmonic drive 12 can thus be equipped with a constructionally easily influenceable overload protection and free-wheeling characteristic by means of spokes 21 of its internal geared wheel 15 which are specifically deformable in a torque-dependent or rotation-direction-dependent manner, that is to say which are flexurally non-rigid. To this end, the spoke shafts 22 are divided transversely to or in the radial direction in relation to the drive axis 24. This division is bridged flexibly in the peripheral direction of the internal geared wheel 15 so as, when corresponding bending stress occurs, to reduce the effective length of the spoke 21 in the radial direction in relation to the axis 24 by buckling the shaft 22 and thus to discontinue the local toothing engagement 19–20, in extension of the spoke 21, between the internal geared wheel rim 13 and the outer support ring 11. The couplings 46 or branches 47 for bridging the spoke division can be designed differently for the two directions of rotation in order to achieve different response behavior up to the direction-dependent free-wheeling characteristic in the case of spokes 21 which are flexurally rigid in only one stress direction, for example in the case of a shape of the spoke shaft 22 which is greatly unsymmetrical in relation to the radials.

What is claimed is:

1. A harmonic drive with, rotating about its axis, a driving core of non-round cross section for coaxial rolling of a wheel rim of a radially deformable spoked-wheel-shaped internal geared wheel, which surrounds the core, in a dimensionally stable support ring of slightly greater diameter, the internal geared wheel being equipped, for torque-limiting, with spokes which are flexurally non-rigid in a torque-dependent manner, characterized in that the spokes are divided transversely to the longitudinal extent of their shafts by a flexibly bridged separating gap, wherein each of the shafts are subdivided about in a middle in a course of a longitudinal extension of the shafts (22) between drive core (14) and inner wheel (15) by such a mold seam (45) as an overload fuse, while the completely separated two halves of the shaft are still bendably connected to each other.

2. The internal geared wheel as claimed in claim 1, characterized in that the flexibly bridged separating gap is bridged by a plastic film.

3. A radially deformable and spoked-wheel-shaped internal geared wheel, characterized in that it is equipped for torque-limiting with spokes divided transversely to the longitudinal extent of their shafts by a flexibly bridged separating gap, which spokes are flexurally non-rigid in a torque-dependent manner, wherein the radially deformable and spoked-wheel-shaped internal geared wheel is adapted for a harmonic drive having a driving core of non-round cross section rotating around an axis of the harmonic drive for coaxial rolling of a wheel rim of the radially deformable spoked-wheel-shaped internal geared wheel, which surrounds the driving core, in a dimensionally stable support ring of slightly greater diameter, wherein each of the shafts are subdivided about in a middle in a course of a longitudinal extension of the shafts (22) between drive core (14) and inner wheel (15) by such a mold seam (45) as an overload fuse, while the completely separated two halves of the shaft are still bendably connected to each other.

4. The internal geared wheel as claimed in claim 3, characterized in that the flexibly bridged separating gap has at least one elastically extensible coupling (46).

5. The internal geared wheel as claimed in claim 3, characterized in that the flexibly bridged separating gap has at least one elastically extensible coupling (46) in the extent of the separating gap (45).

6. The internal geared wheel as claimed in claim 5, characterized in that within the flexibly bridged separating gap is at least one flexible coupling (46) located at least one end of the separating gap (45).

* * * * *